United States Patent [19]

Astakhov

[11] Patent Number: 6,000,463
[45] Date of Patent: Dec. 14, 1999

[54] METAL HYDRIDE HEAT PUMP

[75] Inventor: Boris A. Astakhov, Moscow, Russian Federation

[73] Assignee: Thermal Corp., Georgetown, Del.

[21] Appl. No.: 09/233,380

[22] Filed: Jan. 19, 1999

[51] Int. Cl.[6] .................................................. F28D 15/00
[52] U.S. Cl. ...................... 165/104.12; 165/135; 62/480; 62/481
[58] Field of Search ............................... 165/104.12, 135, 165/96; 62/481, 480, 477

[56] References Cited

U.S. PATENT DOCUMENTS

| | | | |
|---|---|---|---|
| 4,178,987 | 12/1979 | Bowman et al. | 165/104.12 X |
| 4,200,144 | 4/1980 | Sirovich | 165/104.12 |
| 4,421,156 | 12/1983 | Vaubel et al. | 165/104.12 |
| 4,659,554 | 4/1987 | Levinson et al. | 423/249 |
| 4,660,629 | 4/1987 | Maier-Laxhuber et al. | 165/104.12 |
| 5,279,359 | 1/1994 | Erickson | 165/104.12 |
| 5,347,830 | 9/1994 | Yamada | 165/104.12 |
| 5,408,847 | 4/1995 | Erickson | 62/480 X |
| 5,419,156 | 5/1995 | Sywulka | 62/481 X |
| 5,676,202 | 10/1997 | Akashi et al. | 165/104.12 |

FOREIGN PATENT DOCUMENTS

| | | | |
|---|---|---|---|
| 575203 | 4/1933 | Germany | 62/481 |
| 0063513 | 4/1983 | Japan | 165/104.12 |
| 63-27624 | 6/1988 | Japan . | |
| 1-21432 | 4/1989 | Japan . | |
| 001613826 | 12/1990 | U.S.S.R. | 62/480 |

*Primary Examiner*—Christopher Atkinson
*Attorney, Agent, or Firm*—Martin Fruitman

[57] ABSTRACT

The apparatus is a hydride heat pump which uses double communicating section containers holding high and low temperature metal hydrides, with the containers moving back and forth within channels between three heat exchangers. The preferred device has a cylindrical body with the several cylindrical channels in a circular pattern around the axis of the cylindrical body. High, medium, and low temperature heat exchangers are located in the body in sequence along the channels. Transition regions formed by thermal bridges alternating with thermal insulation are located along the channel walls between the heat exchangers to transfer heat among all the hydride containers located in each transition region. The lengths of the heat exchangers and the transition regions, the geometry of the containers, the timing of the reciprocation, and the number of channels are selected so that at least two containers moving in opposite directions are in contact with the transition zones at any time.

8 Claims, 3 Drawing Sheets

FIG. I

METAL HYDRIDE HEAT PUMP

BACKGROUND OF THE INVENTION

This invention deals generally with refrigeration, and more specifically with metal hydride heat pumps powered by waste or solar heat.

Metal hydride technologies have been well established for nearly two decades. Hydrogen reacts with metals to form metal hydrides, a reaction that is reversible depending upon the temperature and pressure. Metal hydride heat pump technology is receiving increasing attention in recent years, partially due to the call for more compact and higher performance thermal control systems that consume minimal electricity. A metal hydride heat pump uses the energy associated with the hydrogen and metal reaction to perform heating and cooling, and thereby consumes minimal electricity. Furthermore, metal hydrides can store thermal energy indefinitely without insulation.

There are two main reasons for the limited use of metal hydride heat pumps at the present time. One reason is the low efficiency of metal hydride heat pumps compared to vapor compression heat pumps, and the other reason is the reliability problems of metal hydrides after many absorption and desorption cycles. Metal hydride reliability has been significantly improved, and over 100,000 hydriding and dehydriding cycles have been successfully demonstrated for a number of commonly used metal hydrides.

Japanese Patent No. 63-27624 (1988) shows a metal hydride heat pump constructed as a body within which high, medium and low temperature containers enclosing metal hydride oscillate with a rotational motion to transfer heat to a fluid.

Japanese Patent No. 1-21432 (1989) discloses metal hydride within two adjoining containers which are attached but whose volumes are not interconnected. The first embodiment reciprocates linearly along the axis of the containers so that at any one time the two containers are in thermal contact with different heat exchangers, and a second embodiment reciprocates with rotational motion to accomplish the same result.

Each of these devices operates on the same well established principle. A container with higher temperature metal hydride is exposed to heat at an input heat exchanger, and the heat causes the hydride to decompose and pressurize the sealed container with hydrogen, thus storing heat energy within the container. Either an increase of pressure or a decrease in temperature within the container will then cause the hydrogen to be reabsorbed by the metal hydride. The higher temperature metal hydride container is then moved to the mid-temperature heat exchanger where it is exposed to a lower temperature, and the metal hydride is reformed as the hydrogen is absorbed and the container gives up heat to the mid-temperature heat exchanger. The higher temperature metal hydride is then moved back to the input heat exchanger to absorb more heat energy, and at the same time a container with lower temperature metal hydride is moved into contact with the mid-temperature heat exchanger. The lower temperature metal hydride then picks up heat from the mid-temperature heat exchanger and moves it to the lower temperature heat exchanger in the same manner that the higher temperature metal hydride container operates. Furthermore, since the two containers are attached, their movement is simultaneous.

Essentially, a bucket brigade of packages of heat is established, and it should be appreciated that as these packages of heat are moved they not only heat the cooler region, but they also cool, that is remove heat from, the hotter region. Thus, this arrangement can be used as either a heater or air conditioner.

However, the disadvantage of these prior art structures is the low efficiency due to thermal losses during each heating and cooling of the non-reactive containers which enclose the metal hydrides. Furthermore, the energy consumption of these prior art metal hydride heat pumps also increases as the difference between ambient temperature and the hydride generated temperature increases.

Thus, there is still a need for improving efficiency beyond the efficiency offered by the metal hydride heat pumps of the prior art.

SUMMARY OF THE INVENTION

The present invention is a metal hydride heat pump with increased efficiency over that of the prior art. This benefit is accomplished by using a single heat pump body with several channels within the body and with a longitudinally reciprocating container containing metal hydrides in each of the several channels. The containers contain both higher and lower temperature hydrides separated by the distance between their locations at opposite ends of a relatively long structure, and the containers permit hydrogen to move between the higher and lower temperature hydrides. The structure also transfers heat between oppositely moving containers at transition regions located between heat exchangers. In this manner the heat is transferred between metal hydride containers and therefore is conserved to increase the system efficiency.

The body of the metal hydride heat pump of the preferred embodiment of the invention is a longitudinal structure with six parallel circular cross section channels extending along the length of the body. The channels are arranged in a circular array, so that each channel is adjacent to two others and no channels are separated by a distance greater than the diameter of the circular array. Heat exchangers are located near the ends of the body of the metal hydride heat pump, and a third heat exchanger is located midway between the end heat exhangers. One end heat exchanger is the high temperature heat exchanger, the other end is the low temperature heat exchanger, and the middle heat exchanger operates in the mid-temperature range. Each of these heat exchangers is thermally connected to outside devices which transfer heat to or from the heat exchangers within their appropriate temperature ranges.

The transition regions are located in the body between the heat exchangers and are constructed of alternating layers of heat conducting bridges and heat insulating materials. Therefore, they prevent heat flow along the channels and between the heat exchangers, but assure that, throughout the entire cross section of the body in each transition region, the portions of all the channels located in each transition region are in thermal communication. Thus, when at least two metal hydride containers are located in the same transition region at any time, heat flows from the hotter metal hydride container to the cooler one.

Each of the several metal hydride containers is divided into two sections which are separated from each other. One section holds a higher temperature metal hydride and the other section holds a lower temperature metal hydride. However, the inner volumes of the two sections communicate with each other, so that hydrogen gas generated in one section can flow into the other section if the gas pressure in the second section of the container is lower. It should be appreciated that, if the pressure and temperature conditions are suitable, hydrogen generated by one metal hydride can be absorbed at the other metal hydride, but that it is also possible to maintain conditions which limit this effect.

The present invention therefore has the dual capability of moving hydrogen within the containers between the higher and lower temperature hydrides, and also transferring heat between containers. It is this unique dual capability which permits the invention to operate with greater efficiency than has been previously available for metal hydride heat pumps.

In operation the containers are attached to and moved in a timed intermittent reciprocating motion by cables which are driven by low power electric motors, and in the preferred embodiment which has six containers, it is possible to operate two containers with each of three cables.

It is interesting to note the analogy between oppositely moving metal hydride containers and a conventional counter flow heat exchanger. In the counter flow heat exchanger a hotter fluid flows in one direction and a cooler fluid flows in the opposite direction within a structure which conducts heat between them. Such heat exchangers are sometimes used to conserve energy in a building by heating or cooling air coming into the building with the air being exhausted from the building.

Similarly, in the present invention, oppositely moving metal hydride containers are thermally coupled through the heat conductive transition regions, and the energy within the body of the heat pump is transferred between the containers rather than being lost to the environment. One requirement for accomplishing this energy transfer is that at least two oppositely moving metal hydride containers must be in contact with the same heat conductive transition region at any time. The resulting exchange of heat between two containers also minimizes the hydrogen flow from one hydride to another within each container during the hydriding and hydrogen generation reactions taking place within the oppositely moving containers. Without this minimization action it might be necessary to include control valves within each container or the cycle time would increase.

While the best coefficient of conversion (efficiency) attained by prior art metal hydride heat pumps has been 0.5 at a temperature difference of 30 degrees C. or less between the low temperature heat exchanger and the mid-temperature heat exchanger, the result of the structure and operation of the invention is a coefficient of conversion of 0.7 to 0.9 regardless of the temperature difference.

DETAILED DESCRIPTION OF THE INVENTION

Figure 1:
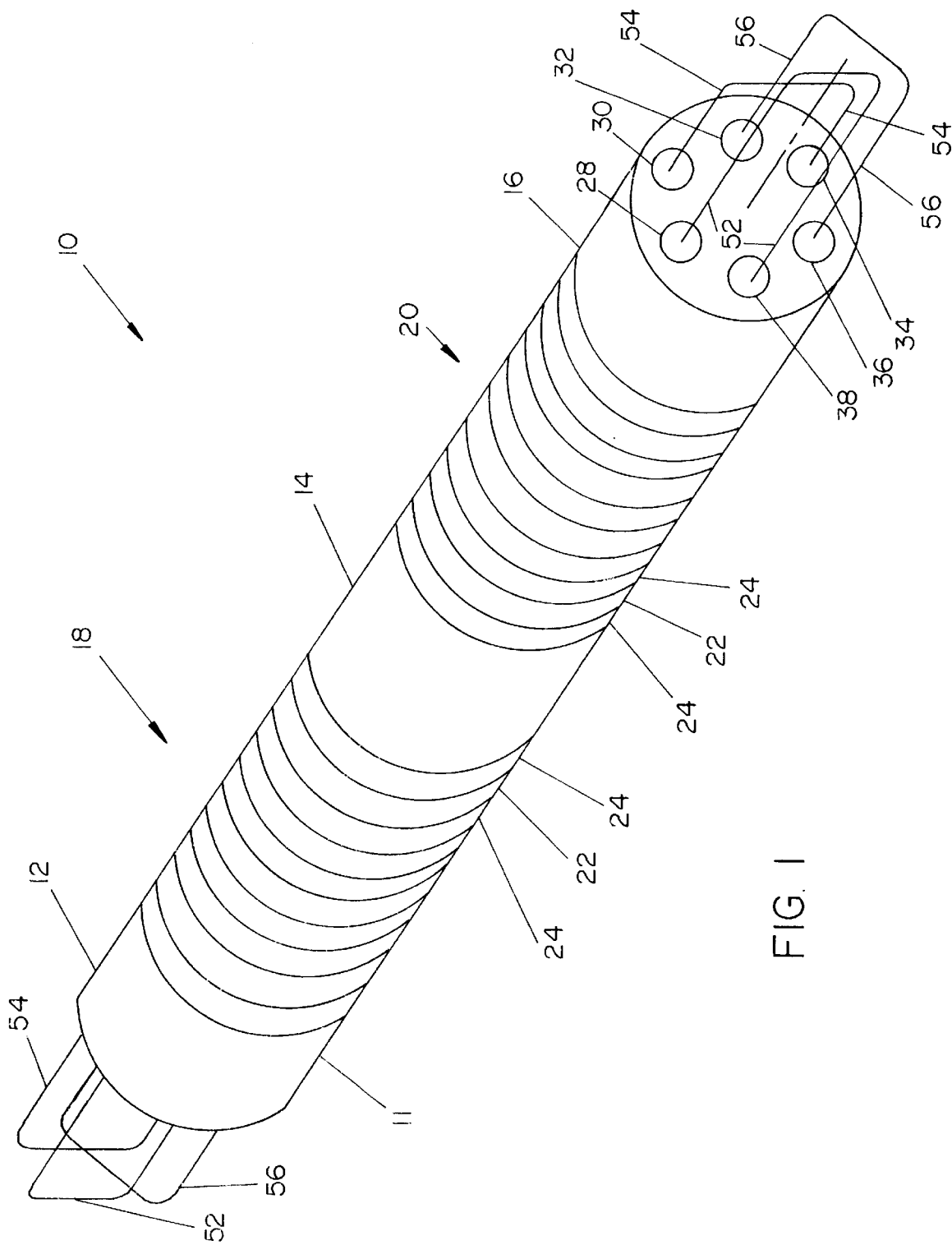
FIG. 1 is a perspective view of the preferred embodiment of the invention.

FIG. 1 is a perspective view of the preferred embodiment of the invention in which metal hydride heat pump 10 is constructed of body 11 which is separated into three heat exchangers, high temperature heat exchanger 12, mid-temperature heat exchanger 14, and low temperature heat exchanger 16. The heat exchangers are separated by transition regions 18 and 20 which are constructed of alternating layers of heat conducting bridges 22 and thermal insulating layers 24. Thus, insulating layers 24 prevent heat transfer between heat exchangers 12, 14, and 16, but thermal bridges 22 transfer heat throughout the cross section of body 11 within each transition region 18 and 20. Thermal bridges 22 are preferably constructed of high thermal conductivity foamed metal, for instance copper.

A group of six parallel channels 28, 30, 32, 34, 36, and 38 are built into body 11 and located in a circular pattern around axis 26 of body 11. As a result of the construction of the transition regions, all the channel walls in each of the two transition regions are in thermal communication.

Each of the channels has an internal reciprocating container 40, 42, 44, 46, 48, and 50 within it (see FIG. 2), and each container is attached to and moved by one of the cables 52, 54, or 56. The containers are moved in a controlled intermittent sequence. While it would be possible to move each container with a separate and independently operated cable, since operation of the invention requires that pairs of containers are moved together, in the preferred embodiment, two containers are attached to each of the cables. Furthermore, since each container is moved in a reciprocating motion, cables 52, 54, and 56 are actually constructed as closed loops to allow convenient movement of each cable by a simple motor driven pulley. Although cables 52, 54, and 56 are shown in FIG. 1 as closed loops, their pulleys and motor drive have been omitted for clarity.

Figure 2:
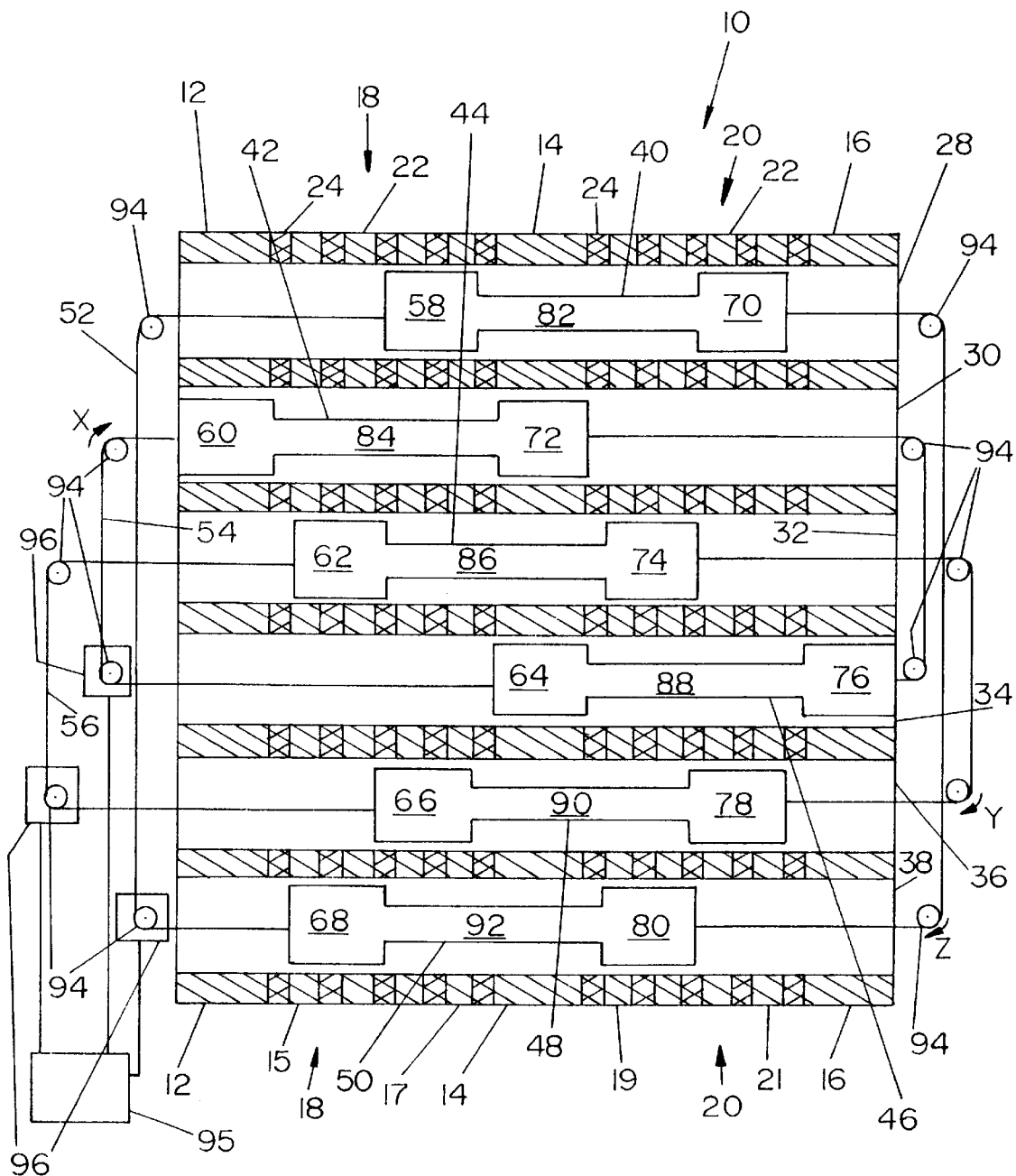
FIG. 2 is a partial cross section schematic diagram of the preferred embodiment of the invention with the circular pattern of channels in FIG. 1 "unrolled" into a planar configuration to better describe the operation of the invention.

FIG. 2 is a partial cross section schematic diagram of the preferred embodiment of the invention with the circular pattern of channels of FIG. 1 "unrolled" into a planar configuration to better describe the operation of the invention. It should therefore be understood that channel 28 at the top of FIG. 2 and channel 38 at the bottom of FIG. 2 are actually, as seen in FIG. 1, adjacent to each other.

Containers 40, 42, 44, 46, 48, and 50 are all constructed to move easily within their respective channels, and as discussed earlier, the containers are attached to cable loops 52, 54, and 56 in pairs so that two selected containers move together in the same direction and for the same distance. Each container is constructed with two hydride sections separated from each other, but with an interconnecting section which permits the interchange of gas between the hydride sections.

Thus, higher temperature hydride sections 58, 60, 62, 64, 66, and 68 all enclose a higher temperature hydride such as $LaNi_{4.75}AL_{0.25}Hx$, while lower temperature hydride sections 70, 72, 74, 76, 78, and 80 all enclose a lower temperature hydride such as $MmNi_{4.15}FE_{0.85}Hy$. Interconnecting sections 82, 84, 86, 88, 90, and 92 mechanically separate the higher temperature hydride sections and the lower temperature hydride sections, but permit hydrogen to pass between them.

The three sections of each container are dimensioned so that the higher and lower temperature hydride sections are separated by the same distance that separates heat exchangers 12, 14, and 16, so that when a hydride container is aligned with a heat exchanger, the other hydride container to which it is attached is always aligned with another heat exchanger. The dimensions are also chosen so that when one hydride container is aligned with a transition region, the attached hydride container will be aligned with the other transition region of body 11.

The arrangement for moving the containers is shown more clearly in FIG. 2. Each cable 52, 54, and 56 is attached to two containers and strung around four pulleys 94, so that the moving forces applied to each container are aligned with the channel in which the container moves. Power is applied to one pulley 94 of each cable by reversible motors 96, and the motors are connected to and controlled by timing control 95.

Metal hydride heat pump 10 is thereby powered by the three low power electric motors 96 and operates as a refrigerator in the manner described below, based upon the starting positions of the various components as shown in FIG. 2.

Figure 3:
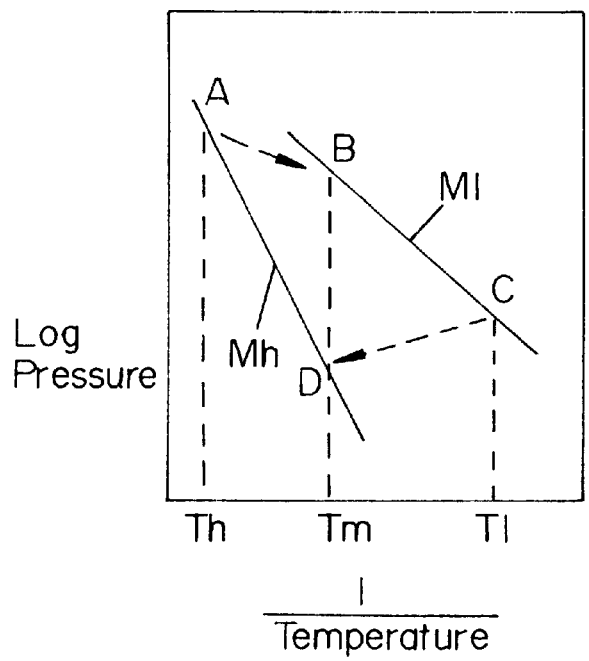
FIG. 3 is a graph of the thermodynamic cycle of the preferred embodiment when used as a refrigerator.

FIG. 3 which is discussed concurrently with FIG. 2, is a graph representing the thermodynamic cycle of the following described refrigerator operation of the invention. In FIG. 3, Th, Tm, and Tl designate the temperatures determined by the high, medium, and low temperature heat exchangers respectively, and the Mh and Ml lines represent the temperature and pressure relationships of the higher and lower temperature metal hydrides, respectively. The vertical axis of the graph of FIG. 3 represents the log of the pressure, the horizontal axis of the graph represents the inverse of the temperature reading, and the dashed arrows represent the movement of hydrogen gas between the hydride sections of the containers.

In FIG. 2 when heat is applied to high temperature heat exchanger 12 at a temperature of 150 to 170 degrees C., the higher temperature metal hydride in high temperature hydride section 60 of container 42 heats up to the input temperature of heat exchanger 12 and decomposes to release hydrogen gas. The conditions determined by this action are depicted at point A on the Mh line in FIG. 3. The hydrogen released in high temperature section 60 then flows through interconnecting section 84 into low temperature hydride section 72 where it is absorbed by the lower temperature metal hydride at near room temperature, 15 to 30 degrees C. This temperature is determined by a heat exchange fluid introduced at mid-temperature heat exchanger 14. As the hydrogen gas reacts with the lower temperature hydride this action is represented by point B in FIG. 3 which is on the Ml line.

After a period of time sufficient for the hydride reactions to stabilize, container 42 is moved to the right so that high temperature section 60 and low temperature section 72 move into transition regions 18 and 20, respectively. The optimum time each container is within heat exchangers 12, 14, and 16 is 4–6 minutes, and the rest of the time the containers move between positions in 1–3 minute steps, but this timing will vary depending upon the device parameters.

At the time of the movement of container 42 to the right, container 46 which is attached to the same cable 54, moves to the left so that its high and low temperature metal hydride containers are in the same transition regions as the same sections of container 42. Thus, section 60 of container 42 which is at 150–170 degree C. transfers its heat to section 64 of container 46, which had been in contact with heat exchanger 14 and is therefore at 15–30 degrees C.

This is the effect which yields the higher efficiency for the invention, because without the heat transfer in the transition zone, the heat energy in section 60 would merely be disposed of by flowing out to much cooler heat exchanger 14. Instead, that heat energy in section 60 is used to raise the temperature of section 64 before it comes into contact with high temperature heat exchanger 12 so the heat energy is retained within the system, and reduces the amount of heat that section 64 will later require to be raised to its temperature for emitting hydrogen.

The same type of heat conservation phenomenon also occurs between low temperature hydride section 72 of container 42 and low temperature hydride section 76 of container 46, which are also in thermal communication at transition region 20, but at lower temperatures.

When the higher temperature metal hydride in section 60 cools upon exposure to the lower temperature of section 64 its pressure-temperature condition follows line Mh to point D on FIG. 3. After a time delay sufficient to transfer most of the heat from hydride sections 60 and 72 of container 84 to hydride sections 64 and 76 of container 88, container 84 is again moved to the right to align hydride section 60 with mid-temperature heat exchanger 14 and align hydride section 72 with low temperature heat exchanger 16.

This movement also moves container 88 to the left to align hydride section 64 with high temperature heat exchanger 12 and align hydride section 76 with mid-temperature heat exchanger 14. At this point container 88 begins the cycle as described for container 84 by being heated at high temperature heat exchanger 14.

Returning to the action of container 84, as hydride section 60 containing the higher temperature hydride is in contact with mid-temperature heat exchanger 14, and hydride section 72 containing the lower temperature hydride is in contact with low temperature heat exchanger 16, their temperatures are lowered. The lowering of temperature is sufficient to cause the higher temperature hydride in section 60 to absorb hydrogen and lower the pressure, which causes the lower temperature hydride in section 72 to release hydrogen. This release of hydrogen from the lower temperature hydride cools it to 0 to –15 degrees C. and absorbs heat from low temperature heat exchanger 16. Eventually, after sufficient cycles have occurred to attain stable operating conditions, low temperature heat exchanger 16 is cooled to the same low temperature. For the lower temperature hydride in section 72, this cooling effect is shown in FIG. 3 by line Ml, and the end point is point C., at which point the hydrogen gas is transferred to the higher temperature hydride (point D).

After a time delay sufficient to have the lower temperature hydride in section 72 absorb most of the heat it is capable of absorbing, container 84 is moved to the left and into contact with the transition regions. At this point, since container 88 is moving in the opposite direction, and has also come into contact with the transition regions, container 84 begins to absorb heat from hotter container 88 and both hydrides simultaneously beginning changing their conditions, essentially beginning to move higher on their respective lines in FIG. 3 and away from points C and D.

After a delay, container 84 then returns to its starting point with high temperature hydride section 60 in contact with high temperature heat exchanger 12. This, of course, occurs as container 88 moves to the far right of its travel and begins removing heat from the low temperature heat exchanger.

Of course, it is most desirable to maintain good thermal contact between each hydride section and the surface of the channel within which it moves. Conventional high thermal conductivity lubricants are generally available to fulfill this requirement.

It is also apparent that during startup of the system, thermal bridges 22 do not conduct heat at full capacity, because the temperatures of the various hydride sections have not yet reached levels to afford the maximum temperature differences required. If fact, during startup it is even practical to move the first containers through the cycle without stopping at the transition regions. Essentially, the invention reaches its full capacity when each metal hydride in the structure has operated through a complete thermodynamic cycle.

It should be appreciated that the preceding description of operation suggests that each pair of containers has only three positions, and in the middle position both containers of the interacting pair are in contact with the same thermal bridges of the transition regions so that the thermal bridges are transferring heat between the containers. However, transition regions can also be constructed as shown in FIG. 2 in which they are approximately twice as long as the hydride sections. Thermal bridges 22 actually divide the transition regions into multiple individual heat transfer zones, and these zones are shown in FIG. 2 as zones 15 and 17 in transition region 18 and zones 19 and 21 in transition region 20. This geometry provides the ability to provide two different positions within each transition region for hydride sections and is consistent with the use of multiple pairs of interacting containers.

FIG. 2 shows two additional pairs of interacting containers, 82 and 92, and 86 and 90. Each of these pairs operate in exactly the same manner as containers 84 and 88 described above, but it is highly advantageous to time the motion of the three pairs of containers so that the hydride sections of two of the pairs of containers are always in the transition regions, but in different zones. Thus, when, as described above and as shown in FIG. 2, hydride section 60 is within high temperature heat exchanger 12 and hydride section 72 is within mid-temperature heat exchanger 14, hydride sections 58 and 66 are within zone 17 and sections 62 and 68, are within zone 15 in transition region 18. Also, hydride sections 70 and 78 are within zone 21 and sections 74 and 80 are within zone 19 in transition region 20.

Furthermore, the next step in the sequence of motion as described above in regard to the operation of the invention, with the directions of motion as shown by arrows X, Y, and Z in FIG. 2, will move each container one step in the series of positions. That will put containers 84 and 88 into the transition regions and will move containers 82 and 92 out of the transition regions, thus maintaining the same configuration in the transition regions. In each such step of the sequence there are always two oppositely moving hydride sections in each of the two zones of each transition region.

Therefore, the transition regions of the preferred embodiment which are twice the length of the hydride sections, along with three pairs of interconnected containers and each pair moving in sequence through a four step, timed path, result in there always being two hydride sections giving up heat and two hydride sections taking on heat in each transition region. Furthermore, each of the heat providers and heat receivers in each transition region is actually in a different zone, so that there is little heat transfer between the two hotter hydride sections or between the two cooler hydride sections.

This structure and timing arrangement furnishes a particular benefit. It provides the action which makes the invention analogous to a counter flow heat exchanger which is more efficient than, for instance, a regenerator. Furthermore it assures that in each zone within a transition region each hotter hydride section is always matched by a cooler hydride section to accept the heat. This reduces the likelihood that heat will be lost to the surrounding environment.

The operation of the invention as a superheater, that is, to raise the temperature, is similar to the operation described above, except that the energy source corresponds to the medium temperature, and the temperature being generated is the higher temperature.

Figure 4:
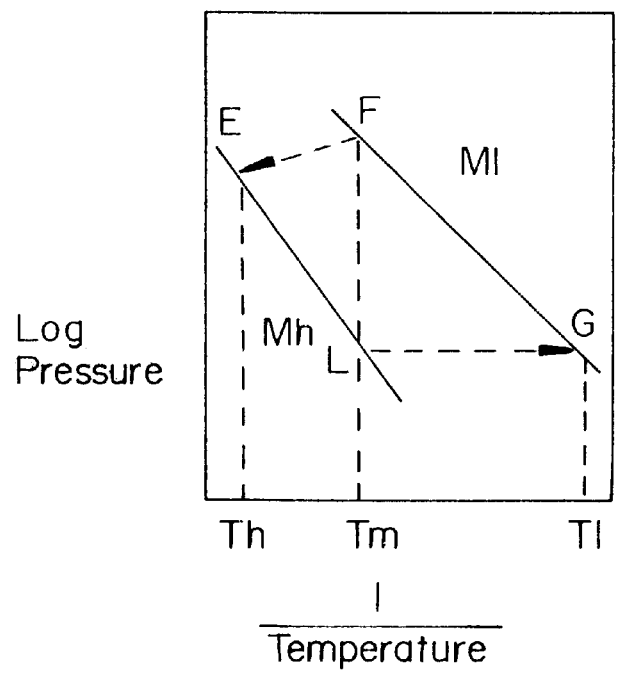
FIG. 4 is a graph of the thermodynamic cycle of the preferred embodiment when used as a superheater.

FIG. 4 is a graph representing the thermodynamic cycle of the operation of the invention as a heater. In FIG. 4, Th, Tm, and Tl designate the temperatures determined by the high, medium, and low temperature heat exchangers respectively, and the Mh and Ml lines represent the temperature and pressure relationships of the higher and lower temperature metal hydrides, respectively. The vertical axis of the graph of FIG. 4 represents the log of the pressure, the horizontal axis of the graph represents the inverse of the temperature reading, and the dashed arrows represent the movement of hydrogen gas between the hydride sections of the containers.

In the FIG. 4 heating cycle, absorption point E, desorption point F, absorption point G, and desorption point L occur in sequence. $ZrCrFe1.1Hz$ and $LaNi5Hr$ can be used as the high and low temperature metal hydrides, and the temperatures are 110 to 130 degrees C. for the high temperature, 100 degrees C. for the medium temperature, and 15 to 25 degrees C. for the low temperature.

In typical embodiments of the invention, the containers are 26–50 mm in diameter and 300–2000 mm long, and the maximum temperature difference across the radial direction for the containers and the body is 5–10 degrees C. With appropriate design, the temperature difference across the annular gap between the containers and the body is no more than 1 degree C.

Generally, the length of the transition regions, the geometry of the containers, and the timed motion of the containers is selected so that the number of oppositely moving metal hydride sections which are in contact with the thermal bridges is maximized at all times.

Thus, by exchanging heat between higher and lower temperature metal hydrides which are in their cooling and heating phases, and performing that heat exchange in the most efficient manner, as in a counter flow heat exchanger, the invention yields an efficiency close to the theoretical maximum for this type of thermal energy converter, and refrigeration equipment generating a cold temperature of −20 to −40 degrees C. becomes possible.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, a greater or lesser number of channels and containers may be incorporated within body 11.

What is claimed as new and for which letters patent of the united states are desired to be secured is:

1. A metal hydride heat pump comprising:
    a body with a high temperature heat exchanger, a medium temperature heat exchanger, and a low temperature heat exchanger, the heat exchangers being arranged longitudinally along the body in a sequence of high, medium, and low temperature and being spaced apart from each other by equal distances, with the body also including transition regions which separate the heat exchangers and thermally insulate the heat exchangers from each other;
    at least one thermal bridge constructed within each transition region, each thermal bridge constructed of thermally conductive material, thermally isolated from the adjacent heat exchangers, and configured so that each thermal bridge transfers heat in the body in a direction transverse to the longitudinal arrangement of the heat exchangers;

at least one pair of parallel channels formed within the body, each channel extending through all the heat exchangers and transition regions, with the walls of the channels capable of transferring heat to and from the heat exchangers and the transition regions;

a moveable container located within each channel and capable of transferring heat to and from the walls of the channel, each container including two separated hydride sections which are spaced apart by the same distance as the heat exchangers are spaced from each other, and the container also including an interconnecting section which is open to the movement of hydrogen between the hydride sections;

a higher temperature metal hydride enclosed within one hydride section of each container and a lower temperature metal hydride enclosed within the second hydride section of each container, with the higher temperature metal hydride in a hydride section which can be moved to and exchange heat with the high temperature heat exchanger and the lower temperature metal hydride in a hydride section which can be moved to and exchange heat with the low temperature heat exchanger;

means to move each pair of containers within their channel so that the movements of containers in the same pair are always in opposite directions within the body; and timing means to control the movements of the containers within the channels.

2. The metal hydride heat pump of claim 1 wherein the timing means operates so that both hydride sections of both containers of each pair are within transition regions at the same time.

3. The metal hydride heat pump of claim 1 wherein the means to move the containers of each pair is a single cable to which both containers are attached.

4. The metal hydride heat pump of claim 1 wherein the transition regions comprise alternating layers of thermally conductive and thermally insulating materials.

5. The metal hydride heat pump of claim 1 wherein the hydride sections and the transition regions have the same longitudinal dimension as the heat exchanger regions.

6. The metal hydride heat pump of claim 1 wherein the hydride sections have the same longitudinal dimension as the heat exchanger regions and the transition regions have a longitudinal dimension twice that of the hydride sections.

7. The metal hydride heat pump of claim 1 wherein three pairs of containers are included in the body.

8. The metal hydride heat pump of claim 1 wherein the thermal bridges are constructed of high thermal conductivity foamed metal.

* * * * *